United States Patent
Dongling et al.

(10) Patent No.: US 10,007,041 B2
(45) Date of Patent: Jun. 26, 2018

(54) OPTICAL DEPOLARIZER

(71) Applicant: Oplink Communications, LLC, Fremont, CA (US)

(72) Inventors: He Dongling, Guangdong (CN); Zhao Zexiong, Guangdong (CN); Pan Xin, Guangdong (CN); He Tanbin, Guangdong (CN)

(73) Assignee: Oplink Communications, LLC, Fremont, CA (US)

(*) Notice: Subject to any disclaimer, the term of this patent is extended or adjusted under 35 U.S.C. 154(b) by 109 days.

(21) Appl. No.: 13/747,022

(22) Filed: Jan. 22, 2013

(65) Prior Publication Data
US 2014/0016199 A1   Jan. 16, 2014

(30) Foreign Application Priority Data

Jul. 13, 2012  (CN) .......................... 2012 1 0245354

(51) Int. Cl.
*G02B 5/30* (2006.01)
*G02B 27/28* (2006.01)
*G02B 6/27* (2006.01)

(52) U.S. Cl.
CPC .............. *G02B 5/30* (2013.01); *G02B 6/272* (2013.01); *G02B 6/2786* (2013.01); *G02B 27/286* (2013.01); *G02B 6/2746* (2013.01)

(58) Field of Classification Search
CPC .... G02B 5/30; G02B 2027/0178; G02B 6/27; G02B 27/14; G02B 27/149; G02B 27/28; G02B 27/283; G02B 27/286; G02B 6/272; G02B 6/278; G02B 6/2786; G02F 1/0136; G02F 2001/0139

USPC ...... 359/483–485, 494–497, 489.01, 6, 7, 8, 359/9, 15, 16; 385/31; 372/105, 108
See application file for complete search history.

(56) References Cited

U.S. PATENT DOCUMENTS

| | | | | |
|---|---|---|---|---|
| 4,969,720 A | * | 11/1990 | Lins | ..................... G02B 6/2746 359/302 |
| 6,975,454 B1 | * | 12/2005 | Yan | ........................ G02B 6/272 359/484.03 |
| 2002/0135882 A1 | * | 9/2002 | Xie | ..................... G02B 6/2746 359/618 |
| 2004/0218845 A1 | * | 11/2004 | Li et al. | .......................... 385/11 |

(Continued)

FOREIGN PATENT DOCUMENTS

| | | |
|---|---|---|
| CN | 1393722 A | 1/2003 |
| CN | 2530368 Y | 1/2003 |

*Primary Examiner* — Bumsuk Won
*Assistant Examiner* — Ephrem Mebrahtu
(74) *Attorney, Agent, or Firm* — Bo Huang

(57) ABSTRACT

Methods, systems, and apparatus, for optical depolarization. One optical depolarizer includes a light-combining module comprising a birefringent prism, wherein an optic axis of a first crystal of the birefringent prism forms a 90° angle with an optic axis of a second crystal of the birefringent prism; and a depolarization module, wherein the depolarization module is disposed at a light emitting end of the light-combining module, the depolarization module comprising a light splitting component and a light-combining component disposed at an emitting end of the light-splitting component, and a delayer disposed between the light-splitting component and the light-combining component, wherein the delayer is disposed on an emitting optical path of the light-splitting component.

9 Claims, 7 Drawing Sheets

(56) References Cited

U.S. PATENT DOCUMENTS

| | | | |
|---|---|---|---|
| 2005/0094919 A1* | 5/2005 | Li et al. ........................ | 385/11 |
| 2008/0170291 A1* | 7/2008 | Nakamae ........... | B23K 26/0656 |
| | | | 359/362 |
| 2009/0116838 A1* | 5/2009 | Kihara ................ | G02B 6/4208 |
| | | | 398/79 |
| 2010/0054753 A1* | 3/2010 | Futami ................... | G02B 6/272 |
| | | | 398/152 |
| 2013/0121698 A1* | 5/2013 | Li .......................... | H04J 14/00 |
| | | | 398/65 |
| 2013/0250416 A1* | 9/2013 | Xiong et al. ............. | 359/494.01 |

* cited by examiner

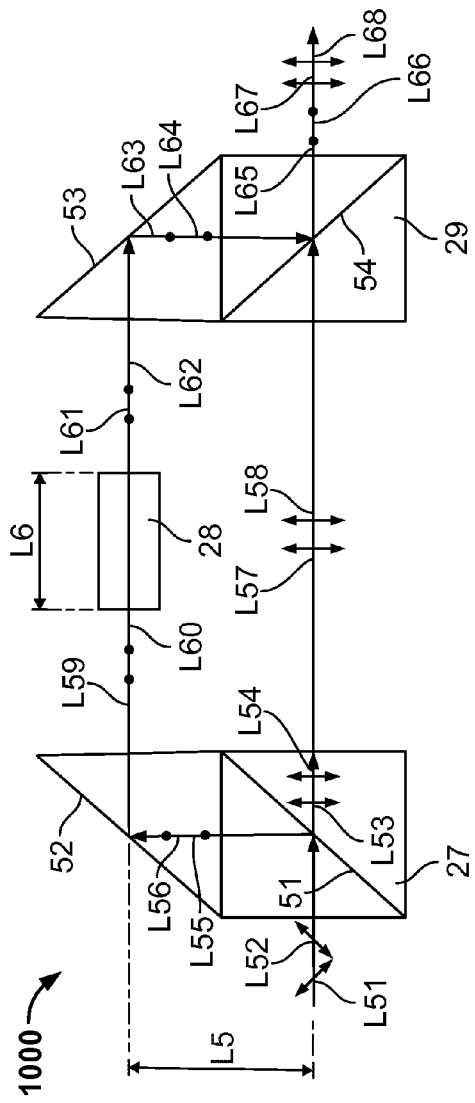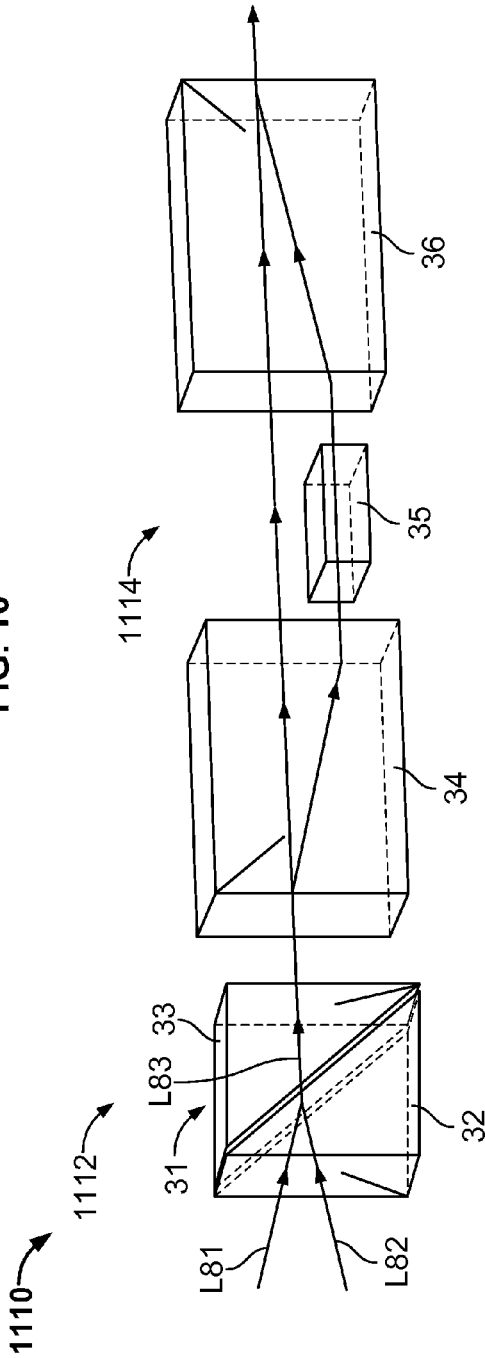

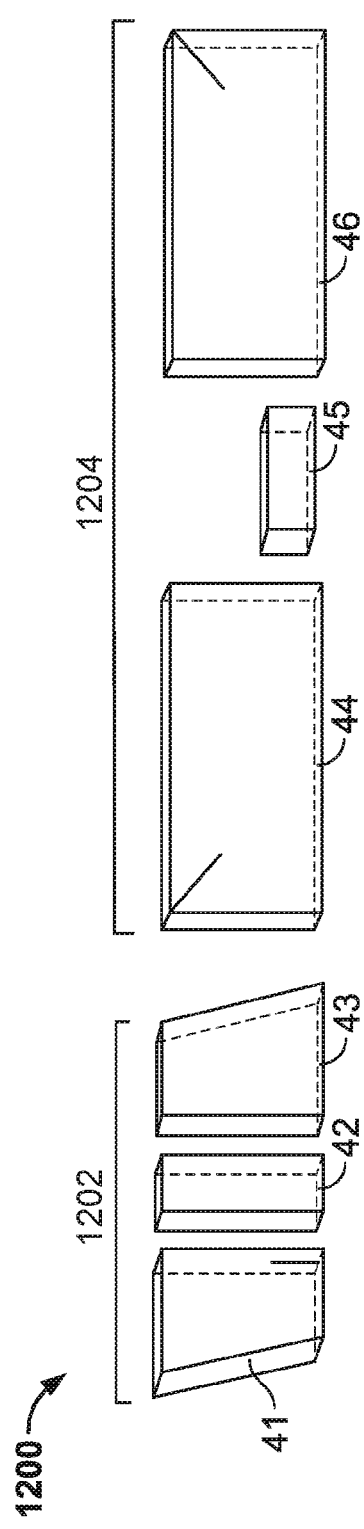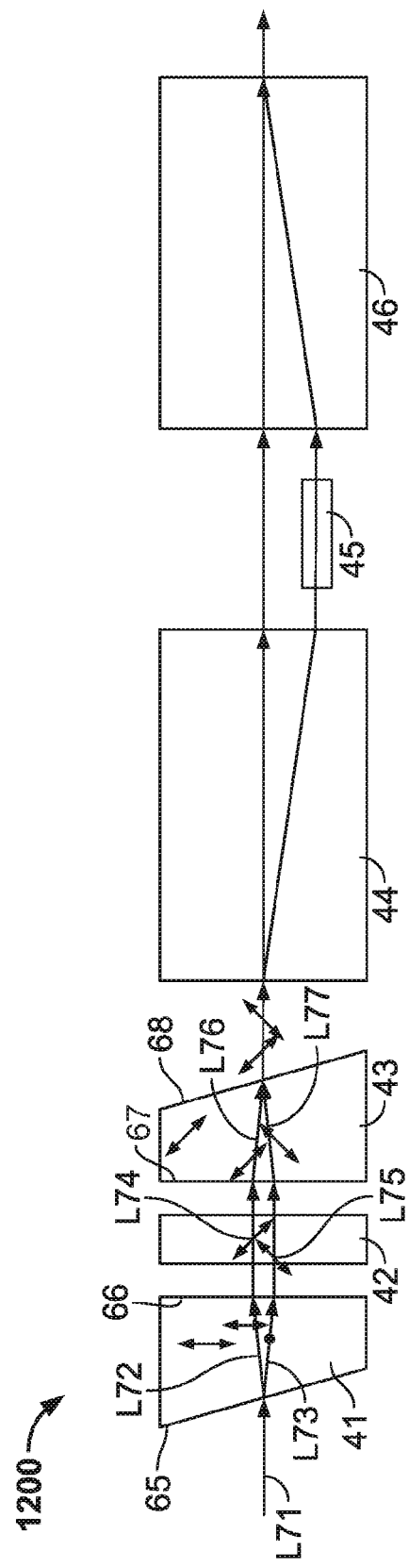

OPTICAL DEPOLARIZER

CROSS-REFERENCE TO RELATED APPLICATIONS

This application claims priority under 35 U.S.C. § 119 to Chinese patent application 201210245354.3, filed Jul. 13, 2012, the disclosure of which is incorporated herein by reference.

BACKGROUND

This specification relates to an optical device and in particular to an optical depolarizer.

Along with the development of network communications and increasingly fast data transfer rate over optical fiber networks, the requirement for capacities of optical fiber networks becomes higher and higher. Most signals transmitted over existing optical fiber networks are polarized. Wear and tear of devices related to the polarization, gains related to the polarization, and other interference sensitive to polarized light all affect the quality of signals transmitted over optical fiber networks. Therefore, some conventional optical fiber networks use optical depolarizers to convert polarized light signals to non-polarized light signals.

Common optical depolarizers include Lyot depolarizers, which have the structure shown in FIG. 1. A Lyot depolarizer 100 includes two segments of birefringent crystals or birefringent optical fibers. In the case of birefringent crystals, the Lyot depolarizer 100 shown in FIG. 1 has a first birefringent crystal 11 and a second birefringent crystal 12, the tail end of the first birefringent crystal 11 connects with the head end of the second birefringent crystal 12. Moreover, the length of the first birefringent crystal 11 is L1, the length of the second birefringent crystal 12 is L2, and L2 is greater than L1, e.g., L2 can be twice as long as L1.

FIG. 2 illustrates a principal birefringent axis at an emitting end of the first birefringent crystal 11 of FIG. 1 and an entering end of the second birefringent crystal 12 in the optical depolarizer of FIG. 1. As shown in FIG. 2, on the connection surface between the first birefringent crystal 11 and the second birefringent crystal 12, the principal axis direction Y of the first birefringent crystal 11 forms a 45° angle with the principal axis direction Y' of the second birefringent crystal 12.

FIG. 3 illustrates a delay of light components at sequential spatial positions when a light beam passes through the optical depolarizer according to the prior art. As shown in FIG. 3, after entering an incident end of the first birefringent crystal 11, incident light u(0) is split into two light components having mutually perpendicular polarization states in the optic axial direction: ordinary light (o light) and extraordinary light (e light), which are expressed as $u_x(0)$ and $u_y(0)$, respectively, in FIG. 3, as identified by reference 300.

The two light components, $u_x(0)$ and $u_y(0)$, have different indexes of refraction relative to the first birefringent crystal 11, which are referred to as o light index of refraction and e light index of refraction. As a result, the two light components, $u_x(0)$ and $u_y(0)$, have different propagation speeds inside the first birefringent crystal 11. After passing the length L1 of the first birefringent crystal 11, the two light components, $u_x(0)$ and $u_y(0)$, become light components, $u_x(L1)$ and $u_y(L1)$ (reference 302), and a time difference is generated between the two light components, $u_x(L1)$ and $u_y(L1)$. The delay $\tau_1$ is expressed by Equation 1 as:

$$\tau_1 = (\Delta n/c) \times L1 \quad \text{(Equation 1)}$$

In Equation 1, $\Delta n$ is the difference between the o light index of refraction and the e light index of refraction, and c is the light speed.

Similarly, after entering the second birefringent crystal 12, the incident light $u_x(L1)$ is further split into two light components, $u_{xx}(L1)$ and $u_{xy}(L1)$. Light components $U_{xx'}(L1)$ and $U_{xy'}(L1)$ have mutually perpendicular polarization states along the directions that are perpendicular and parallel to the optic axis. After passing the length L2 of the second birefringent crystal 12, the light components, $u_{xx}(L1)$ and $u_{xy}(L1)$, become light components, $u_{xx'}(L2)$ and $u_{xy'}(L2)$ (reference 304).

After entering the second birefringent crystal 12, the incident light $u_y(L1)$ is further split into two light components, $u_{yx}(L1)$ and $u_{yy}(L1)$, having mutually perpendicular polarization states along the directions that are perpendicular and parallel to the optic axis. After passing the length L2 of the second birefringent crystal 12, the light components, $u_{yx}(L1)$ and $u_{yy}(L1)$, become light components, $u_{yx}(L2)$ and $u_{yy}(L2)$ (reference 306).

Due to the presence of a time difference between the propagation of light components in different polarization states in a birefringent crystal, a delay is generated. For example, the delay between the light components, $u_{xx'}(L2)$ and $u_{xy'}(L2)$, is $\tau_2$, where $\tau_2$ is calculated as:

$$\tau_2 = (\Delta n/c) \times L2.$$

Typically, to meet demand for converting polarized light into non-polarized light, it is necessary for all light components that reach the emitting end of the second birefringent crystal 12 to be incoherent to each other, i.e. it is required that:

$\tau_1 \geq \tau_c$ and $\tau_2 - \tau_1 \geq \tau_c$, wherein $\tau_c$ is the coherent time of the propagating light. As a result, the length L1 of the first birefringent crystal 11 and the length L2 of the second birefringent crystal 12 need to satisfy the following constraint requirement:

$$L1 \geq (\tau_c \times c)/\Delta n \quad \text{(Equation 2);}$$

$$L2 \geq 2 \times L1 \quad \text{(Equation 3)}$$

However, conventional communication systems often use light sources with relatively narrow spectral distribution, such as Raman amplifiers, etc. Due to the small difference $\Delta n$ in the index of refraction between the o light and the e light in a birefringent crystal, a typical depolarizer requires two birefringent crystals with the total length above one hundred millimeters to realize depolarization. Because of the high cost of birefringent crystals and difficulties in production and assembly of birefringent crystals with such a length, such depolarizers are typically only suitable for depolarizing light sources with a wide spectrum, but typically cannot be used for depolarizing common quasi-monochromatic light with relatively long coherent length. Consequently, the application scope of this conventional depolarizer is greatly limited.

Another conventional depolarizer uses a Wollaston prism as a wave-combining component and disposes a depolarization wave-plate at an emitting end of the Wollaston prism. The thickness of the depolarization wave-plate needs to satisfy the constraint requirement that an optical path difference between fast axis light and slow axis light is greater than the coherent length of the light source.

To make a depolarization wave-plate thick enough to satisfy the above depolarization requirement, the thickness needs to be very long for regular birefringent crystals, such as yttrium vanadate crystal. As a result, this depolarizer has a large volume and moreover, a high production cost.

FIG. 4 is a plot 400 of a spectrum of wavelength and power gain of a Raman pump light source. A light source produced by a Raman pump laser typically contains multiple spectral peaks having different wavelengths. All of these beam components are linear polarized light with a relatively high degree of polarization. Moreover, the power of these beam components varies along with the changes in wavelength, as shown in FIG. 4. A power change curve of a Raman pump light source has periodic peaks and valleys along the wavelength axis. The wavelength difference of the two neighboring peaks is identified by $\delta\lambda$. The wavelength difference $\delta\lambda$ is essentially equal for the wavelengths that every two neighboring peaks correspond to, and the wavelength difference $\delta\lambda$ is very small and typically at the nanometer level or smaller.

To depolarize Raman pump light sources, a Raman pump light is split into two beams each having equal energy and mutually perpendicular polarization states. One of the beams is made to travel an extra optical path such that an optical path difference is generated between the two beams. The optical path difference can ensure that beam component phases of wavelengths that neighboring peaks correspond to are different by half a cycle or an odd number multiple of half a cycle.

FIG. 5 illustrates a plot 500 of a decay of the polarization degree of a Raman pump light in Stokes space. As shown in FIG. 5, when expressed in the Stokes space, phases of all neighboring peaks are different by $\pi$ or an odd number multiple of $\pi$ when emitting, the vector sum thereof will cancel each other, i.e. the composite optical energy over the entire band can be depolarized.

The principle of the above method is to make the phase of a beam at a wavelength in a Raman pump light source different from the phase of the beam at the wavelength of the neighboring peak by an odd number multiple of half a cycle, which can be expressed with the following equation:

$$\Gamma(\lambda)-\Gamma(\lambda+\delta\lambda)=(2m+1)\pi \quad \text{(Equation 4)}.$$

In Equation 4, $\Gamma(\lambda)$ is the phase of the beam with a wavelength of $\lambda$, $\Gamma(\lambda+\delta\lambda)$ is the phase of the beam with a wavelength of $\lambda+\delta\lambda$, m is an integer greater than or equal to zero, and $\pi$ is the phase angle of half a cycle.

In addition, existing light sources require depolarization processing after combining a plurality of beams. When beams of some light sources are emitted, a subsequent system may partially back reflect the beam into the light source to affect the light source. There is a need to isolate the back reflected beam so as to prevent the subsequent system from reflecting the beam into the light source.

SUMMARY

The present specification describes an optical depolarizer for depolarizing Raman pump light sources.

In general, one innovative aspect of the subject matter described in this specification can be embodied in an optical depolarizer that includes an isolation module, the isolation module comprising a first wedge, a rotator disposed at the light emitting end of the first wedge, and a second wedge disposed at the light emitting end of the rotator, wherein a crystal axis of the first wedge forms a 45° angle with a crystal axis of the second wedge; and a depolarization module, wherein the depolarization module is disposed at the light emitting end of the isolation module, the depolarization module comprising a light-splitting component and a light-combining component disposed at the emitting end of the light-splitting component, and a delayer, wherein the delayer disposed between the light-splitting component and the light-combining component, and wherein the delayer is disposed on an emitting optical path of the light-splitting component.

The foregoing and other embodiments can each optionally include one or more of the following features, alone or in combination. The light-splitting component is a first birefringent crystal or a polarization beam splitter and the light-combining component is a second birefringent crystal or a polarization beam combiner. The delayer is a glass piece or a third birefringent crystal.

In general, one innovative aspect of the subject matter described in this specification can be embodied in an optical depolarizer that includes an isolation module, the isolation module including a first wedge, a rotator disposed at the light emitting end of the first wedge, and a second wedge disposed at the light emitting end of the rotator, wherein a crystal axis of the first wedge forms a 45° angle with a crystal axis of the second wedge; and a depolarization module, wherein the depolarization module is disposed at the light emitting end of the isolation module, the depolarization module comprising a light-splitting component and a light-combining component disposed at the emitting end of the light-splitting component, and a delayer, wherein the delayer disposed between the light-splitting component and the light-combining component, and wherein the delayer is disposed on an emitting optical path of the light-splitting component.

The foregoing and other embodiments can each optionally include one or more of the following features, alone or in combination. The light-splitting component comprises a polarizing axis; the light-combining component comprises a polarizing axis; and the projection of the polarizing axis of said light-splitting component on the emitting plane of the second wedge forms a 45° angle with the crystal axis of the second wedge. The light-splitting component is a first birefringent crystal or a polarization beam splitter and the light-combining component is a second birefringent crystal or a polarization beam combiner.

In general, one innovative aspect of the subject matter described in this specification can be embodied in an optical depolarizer that includes a light-combining isolation module, the light-combining isolation module comprising a first polarizer, a rotator disposed at the light emitting end of the first polarizer, and a second polarizer disposed at the light emitting end of the rotator; and a depolarization module, wherein the depolarization module is disposed at a light emitting end of the isolation module, the depolarization module comprising a light-splitting component and a light-combining component disposed at the emitting end of the light-splitting component, and a delayer, wherein the delayer is disposed between the light-splitting component and the light-combining component, and wherein the delayer disposed on an emitting optical path of the light-splitting component.

The foregoing and other embodiments can each optionally include one or more of the following features, alone or in combination. The light-splitting component comprises a polarizing axis; the light-combining component also comprises a polarizing axis; and the projection of the polarizing axis of the light-splitting component on the emitting plane of the second polarizer forms a 45° angle with the optic axis of the second polarizer. The light-splitting component is a first birefringent crystal or a polarization beam splitter and the light-combining component is a second birefringent crystal or a polarization beam combiner.

Particular embodiments of the subject matter described in this specification can be implemented so as to realize one or more of the following advantages. An optical depolarizer is provided for depolarizing Raman pump light sources. The optical depolarizer is configured to have a small volume and a low production cost relative to conventional optical depolarizers. The optical depolarizer integrates three functions of beam combining, isolating, and depolarizing into a miniature package with good performance and ease of manufacture.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 10 illustrates an example depolarization module.

FIG. 11 illustrates the structure of an example optical depolarizer.

FIG. 12 illustrates the structural of an example optical depolarizer.

FIG. 13 illustrates the optical path of an example optical depolarizer.

Like reference numbers and designations in the various drawings indicate like elements.

DETAILED DESCRIPTION

An optical depolarizer is used to depolarize linear polarized light generated by, for example, a Raman pump light source, and can also perform light combination and/or isolation on the linear polarized light.

Figure 6:
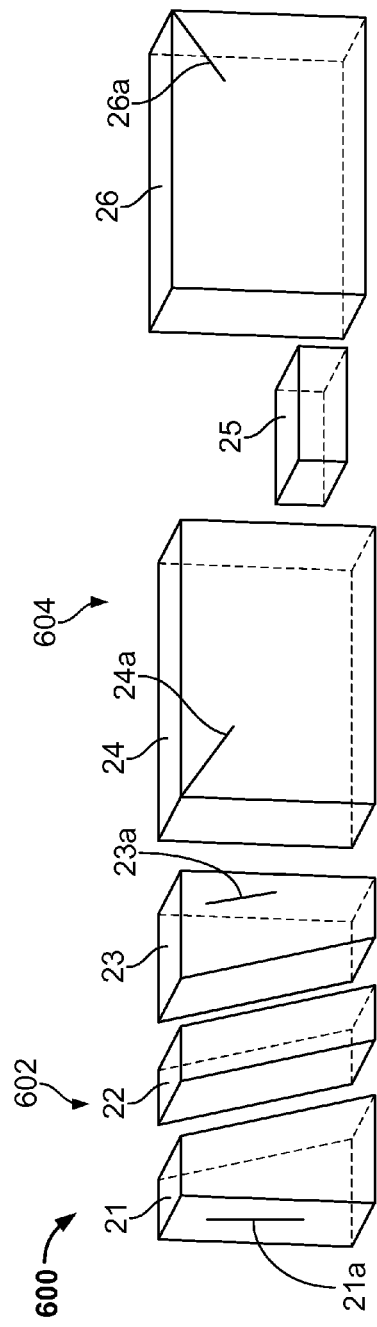
FIG. 6 is a diagram illustrating an example optical depolarizer.

FIG. 6 is a diagram illustrating an example optical depolarizer 600. The optical depolarizer 600 includes a light-combining isolation module 602 and a depolarization module 604 disposed at a light emitting end of the light-combining isolation module 602. The light-combining isolation module 602 includes a polarizer 21, a rotator 22, and a polarizer 23. The depolarization module 604 includes a birefringent crystal 24, a delayer 25, and a birefringent crystal 26. The direction of an optic axis 21a of the polarizer 21 forms a 45° angle with the direction of an optic axis 23a of the polarizer 23 with respect to the light propagation direction.

The birefringent crystal 24 is a light-splitting component and the direction of its optic axis 24a forms an angle with a top surface of the birefringent crystal 24. For example, if the birefringent crystal 24 is an yttrium vanadate crystal, the angle is 47.85°. In such a way, the angle that separates the ordinary light and the extraordinary light is the greatest when they are propagated in the birefringent crystal 24. Thus, the displacement of the ordinary light and extraordinary light relative to each other is large for particular birefringent crystals such that the length of the birefringent crystal can be the minimum necessary to provide a desired displacement. As a result, the short length of the birefringent crystal 24 can produce a large displacement at the emitting end. Similarly, the direction of the optic axis 26a of the birefringent crystal 26 also forms the same angle with the top surface. Moreover, the projection of the optic axis 24a of the displacer 24 on the emitting plane of the polarizer 23 forms a 45° angle with the optic axis 23a of the polarizer 23.

In this example, a polarizing axis of the birefringent crystal 24 is its optic axis 24a, and similarly a polarizing axis of the birefringent crystal 26 is also its optic axis 26a.

Figure 7:
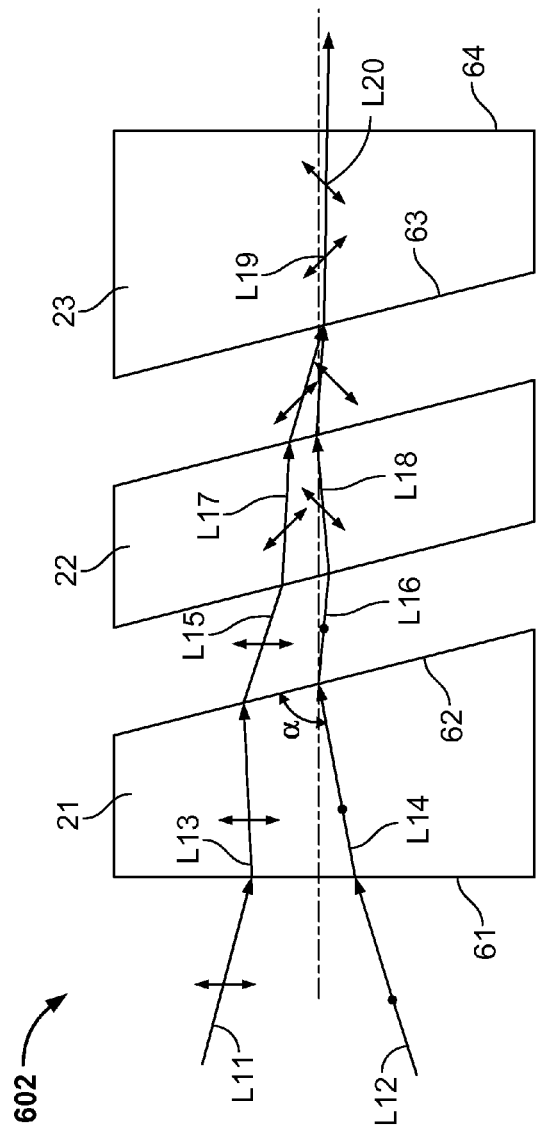
FIG. 7 is a diagram illustrating an optical path that a beam passes through the light-combining module of the example optical depolarizer shown in FIG. 6.

FIG. 7 is a diagram illustrating an optical path that a beam passes through the light-combining isolation module 602 of the example optical depolarizer 600 shown in FIG. 6. The light-combining isolation module 602 is used to combine incident beams and to perform isolation. As described above, the light-combining isolation module 602 includes the polarizer 21, the rotator 22, and the polarizer 23. The rotator 22 is positioned between the polarizers 21 and 23. In particular, the rotator 22 can be configured to function responsive to an applied magnetic field.

An incident plane 61 of the polarizer 21 is perpendicular to the axis of the light-combining isolation module 602, while an emitting plane 62 of the polarizer 21 forms an acute angle α with the axis of the light-combining isolation module 602. The acute angle α needs to coordinate with the angles and polarization directions of two incident beams L11 and L12. The incident beams can be received, for example, from a dual optical fiber polarization-maintaining collimator. In particular, the two incident beams L11 and L12 that enter the polarizer 21 have mutually perpendicular polarization directions. The angle α can be specified to ensure that the two beams L11 and L12 are combined using the light-combining isolation module 602. An incident plane 63 of the polarizer 23 is parallel to the emitting plane 62 of the polarizer 21. An emitting plane 64 of the polarizer 23 is parallel to the incident plane 61 of the polarizer 21.

As shown in FIG. 7, the incident beams L11 and L12 enter the polarizer 21 at an angle, and the polarization state of the beam L11 is perpendicular to the polarization state of the beam L12. After entering the polarizer 21, the beams L11 and L12 are refracted to form beams L13 and L14, respectively. The angle between the beams L13 and L14 is smaller than the angle between the beams L11 and L12. The polarizer 21 does not change the polarization direction of an incident beam. Therefore, the polarization state of the beam L13 is the same as the polarization state of the beam L11, and the polarization state of the beam L14 is the same as the polarization state of the beam L12.

After being emitted from the polarizer 21, the beams L13 and L14 become beams L15 and L16, respectively, and enter the rotator 22. The rotator 22 can be a Faraday rotator. The rotator 22 is configured to rotate polarization in response to a magnetic field. If the rotator 22 does not include a magnet to produce a magnetic field, a magnet may be positioned adjacent to the rotator 22 for producing a magnetic field.

After the beams L15 and L16 enter the rotator 22, the polarization direction is rotated by 45° when viewed from the direction of light propagation. This polarization direction is represented by a 45° slanted line on the plane on the beams, and the same method will be used in subsequent illustrations of polarization states. As shown in FIG. 7, after the beam L15 enters the rotator 22, it forms the beam L17. Compared with the polarization state of the beam L15, the polarization state of the beam L17 is rotated by 45°. Compared with the polarization state of the beam L16, similarly, the polarization state of the beam L18 formed after the beam L16 enters the rotator 22 is also rotated by 45°, where the polarization state of both beams is rotated in the same direction relative to the direction of light propagation.

After being emitted from the rotator 22, the beams L17 and L18 enter the polarizer 23 and are combined on the incident plane 63 of the polarizer 23, i.e. the optical paths are substantially overlapped. After entering the polarizer 23, the beams L17 and L18 form beams L19 and L20, respectively, and are emitted at the emitting plane 64 of the polarizer 23. The optic axis of the polarizer 23 forms a 45° angle with the optic axis of the polarizer 21, and after the rotation by the rotator 22, the ordinary light L13 originally in the polarizer 21 becomes an extraordinary light L19 in the polarizer 23, the extraordinary light L14 originally in the polarizer 21 becomes an ordinary light 20 in the polarizer 23, the beams L19 and L20 can be emitted from the emitting plane 64 of the polarizer 23, where the polarization state of the beam L19 and the polarization state of the beam L20 are perpendicular to each other. As a result, the incident beams L11 and L12 pass through the light-combining isolation module 602, experience a deviation with a large angle, and form two beams L19 and L20 that are propagated on the same optical path for output, which achieves the combination of the beams.

Figure 8:
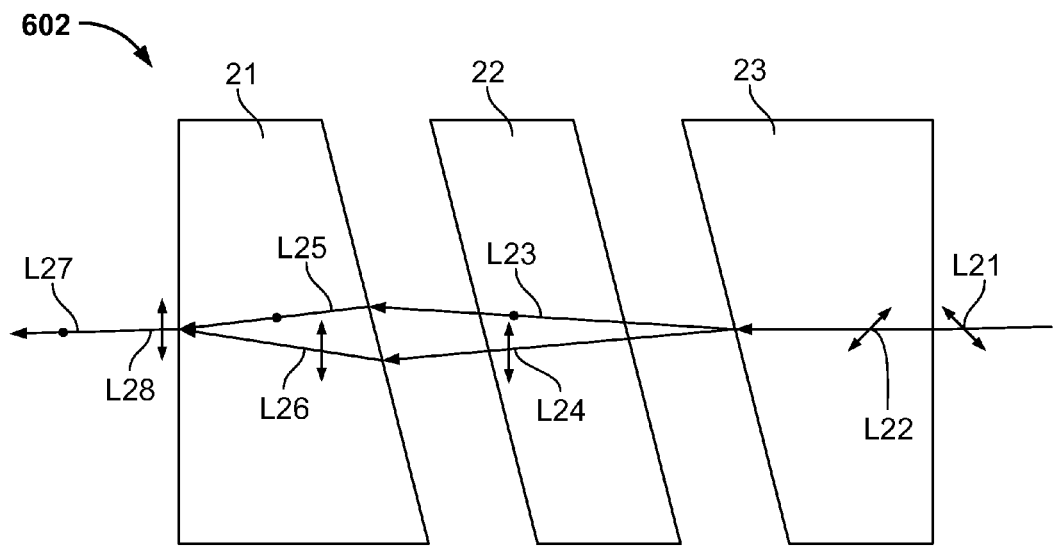
FIG. 8 illustrates the optical path that a beam passes through the light-combining module of the example optical depolarizer shown in FIG. 6 in the reverse direction.

The isolation function of the light-combining isolation module 602 is described below with reference to FIG. 8. FIG. 8 illustrates the optical path that a beam passes through the light-combining isolation module of the example optical depolarizer 600 shown in FIG. 6 in the reverse direction. Assume that two beams L21 and L22 on the same optical path enter the polarizer 23, and that the polarization state of the beam L21 and the polarization state of the beam L22 are perpendicular to each other. After being emitted from the polarizer 23, the beams L21 and L22 are refracted, respectively, to form two beams L23 and L24 and enter the Faraday rotator 22. The polarization state of the beam L23 is rotated by 45° from the polarization state of the beam L21 and the polarization state of the beam L24 is rotated by 45° from the polarization state of the beam L22 and the polarization state of the beam L23 is perpendicular to the polarization state of the beam L24. Since the rotation direction by the rotator, e.g., a Faraday rotator, is only related to the direction of its magnetic field, the propagation direction does not change the amount of rotation. After the rotation by the rotator 22, the ordinary light L22 originally in the polarizer 23 is still an ordinary light L26 in the polarizer 21, and the extraordinary light L21 originally in the polarizer 23 is still an extraordinary light L25 in the polarizer 21.

After being emitted from the rotator 22, the beams L23 and L24 enter the polarizer 21, form beams L25 and L26, respectively, and the polarization states of the beams L25 and L26 are perpendicular to each other. Lastly, the beams L25 and L26 are emitted from the polarizer 21 and refracted to form beams L27 and L28, respectively. The beams L27 and L28 are emitted along the same optical path but parallel to the axis of the light-combining isolation module 602. Comparing FIG. 7 with FIG. 8 shows that after passing through the light-combining isolation module 602, the lights L21 and L22 reflected by the subsequent system are unable to be emitted along the directions of the original incident beams L11 and L12, i.e., it is impossible to enter the original incident optic fiber or fibers, thereby achieving the isolation of the pump light source and preventing the beams incident from a reverse direction, e.g., as reflected light beams, from propagating, for example, to interfere with the pump light source, e.g., a Raman pump light source.

Figure 9:
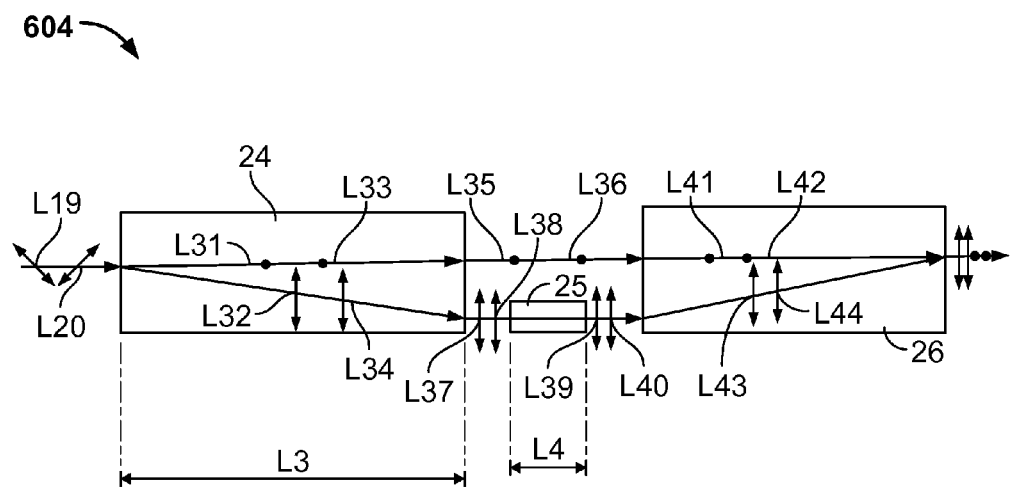
FIG. 9 illustrates the optical path that a beam passes through the depolarization module of the example optical depolarizer shown in FIG. 6.

FIG. 9 illustrates the optical path that a beam passes through the depolarization module 604 of the example optical depolarizer shown in FIG. 6. Referring to FIG. 9, the depolarization module 604 is disposed at the light emitting end of the light-combining isolation module 602 shown in FIG. 6. The depolarization module 604 includes birefringent crystals 24 and 26 and a delayer 25. The delayer 25 is positioned between the birefringent crystal 24 and the birefringent crystal 26, and is further positioned on an emitting optical path of the birefringent crystal 24.

After being emitted from the light-combining isolation module 602, the beams L19 and L20, having mutually perpendicular polarization states, enter the birefringent crystal 24. After the beam L19 enters the birefringent crystal 24, it forms two beams of polarized light L31 and L32 each having respective perpendicular polarization states. After the beam L20 enters the birefringent crystal 24, it also forms two beams of polarized light L33 and L34 having mutually perpendicular polarization states. The beam L31 has the same polarization state as the beam L33, while the beam L32 has the same polarization state as the beam L34.

After being emitted from the birefringent crystal 24, the beams L31 and L33 form beams L35 and L36, and lastly enter the birefringent crystal 26 to form beams L41 and L42. The angle between the optic axis of the birefringent crystal 26 and a top surface of the birefringent crystal 26 is the same as that between the optic axis of the birefringent crystal 24 and a top surface of the birefringent crystal 24, but in the opposite direction. Additionally, in some implementations, the length of the birefringent crystal 24 is the same as the length of the birefringent crystal 26. Consequently, the two beams split by the birefringent crystal 24 can be combined in the birefringent crystal 26.

The optic axes of the birefringent crystals 24 and 26 may not necessarily be arranged as shown in example depolarization module 604. Any suitable optic axis design that can provide optical division in the birefringent crystal 24 and optical combination in the birefringent crystal 26 can be used. After being emitted from the birefringent crystal 24, the beams L32 and L34 form beams L37 and L38, and enter the delayer 25. In this example, the delayer 25 is used to delay the beams L37 and L38. The delayer 25 can be, for example, a glass piece or a birefringent crystal. The delayer 25 can be implemented by any suitable medium with light transmission capability and in which the light propagation speed is lower than that in the air.

After passing through the delayer 25, the beams L37 and L38 become beams L39 and L40, and enter the birefringent crystal 26 to form beams L43 and L44, such that the beams L41, L42, L43 and L44 converge to substantially the same optical path when emitted from the birefringent crystal 26. As a light-combining component, therefore, the birefringent crystal 26 combines beams on a plurality of optical paths.

To depolarize polarized light and satisfy the requirement of Equation 4, it is necessary to set the length $L_3$ of the birefringent crystal 24 and the length $L_4$ of the delayer 25. For a beam with wavelength $\lambda$, a delay time of the ordinary light and the extraordinary light split after entering the birefringent crystal is approximated to be $L_3\Delta n$, wherein $\Delta n$ is the difference between the index of refraction of extraordinary light $n_e$ and the index of refraction of ordinary light $$n_o: \Delta n = n_e - n_o \quad \text{(Equation 5)}.$$

The overall phase delay of a beam after passing through the birefringent crystal 24 and the delayer 25 may be expressed by the following equation:

$$\Gamma(\lambda) = 2\pi[2L_3\Delta n + L_4(n_2-1)]/\lambda \quad \text{(Equation 6)}$$

where $n_2$ is the index of refraction of the delayer 25.

Substituting Equation 6 into Equation 4 provides:

$$\Gamma(\lambda) - \Gamma(\lambda + \delta\lambda) = 2\pi[2L_3\Delta n + L_4(n_2-1)]/\lambda - 2\pi[2L_3\Delta n + L_4(n_2-1)]/(\lambda + \delta\lambda) = (2m+1)\pi \quad \text{(Equation 7)}$$

where m is an integer greater than or equal to zero. When m=0, it can be obtained through calculation that:

$$2[2L_3\Delta n + L_4(n_2-1)]/\lambda - 2[2L_3\Delta n + L_4(n_2-1)]/(\lambda+\delta\lambda) = 1 \quad \text{(Equation 8)}.$$

Figure 1:
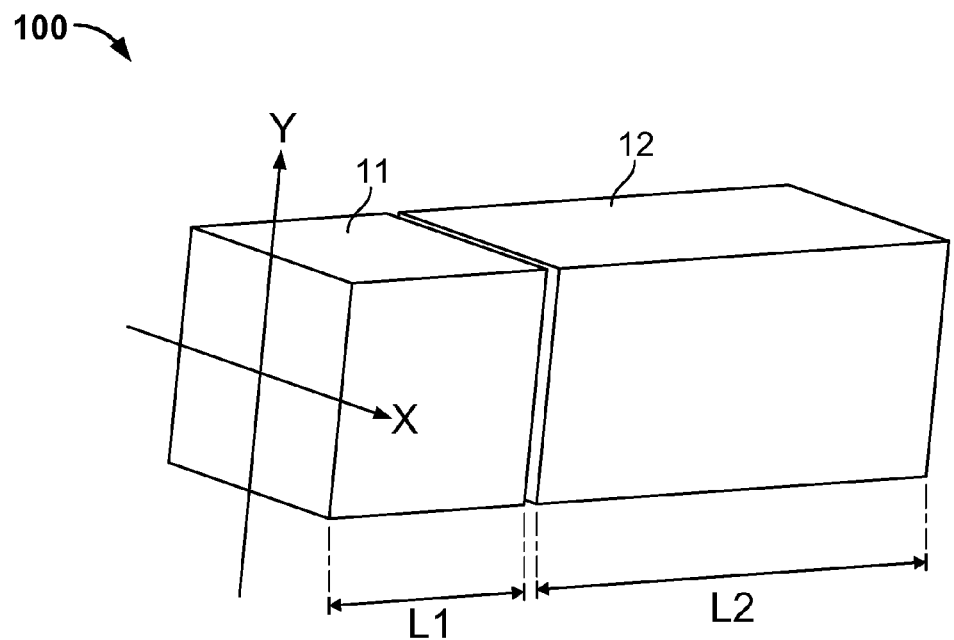
FIG. 1 illustrates the structure of an optical depolarizer.
Figure 2:
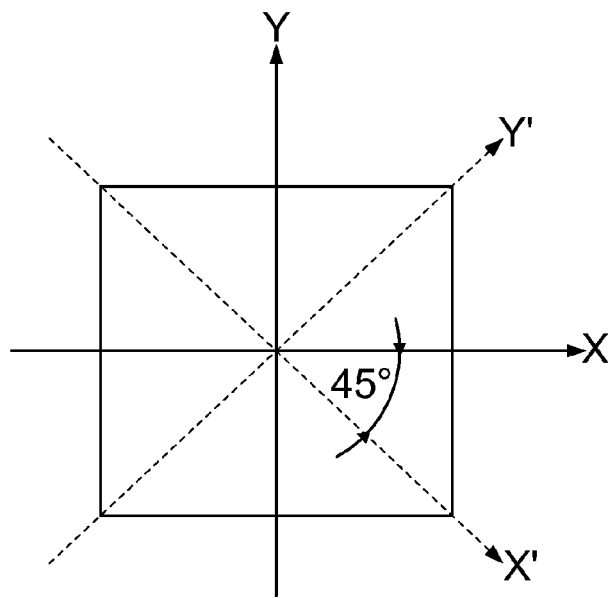
FIG. 2 illustrates the principal birefringent axis at the emitting end of the first segment birefringent crystal and the entering end of the second segment birefringent crystal in the optical depolarizer in FIG. 1.
Figure 3:
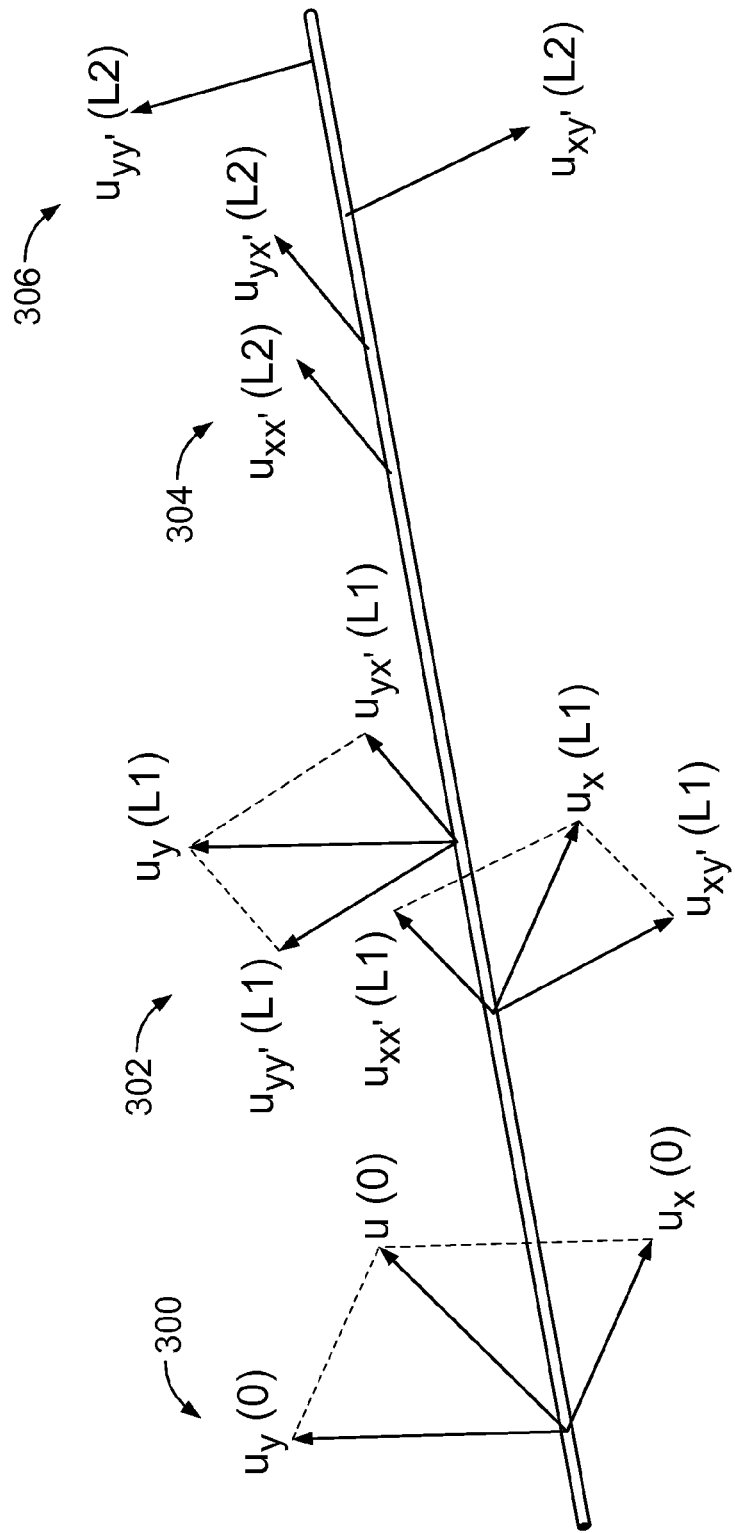
FIG. 3 illustrates the delay of light components at sequential spatial positions when the light passes through an optical depolarizer.
Figure 4:
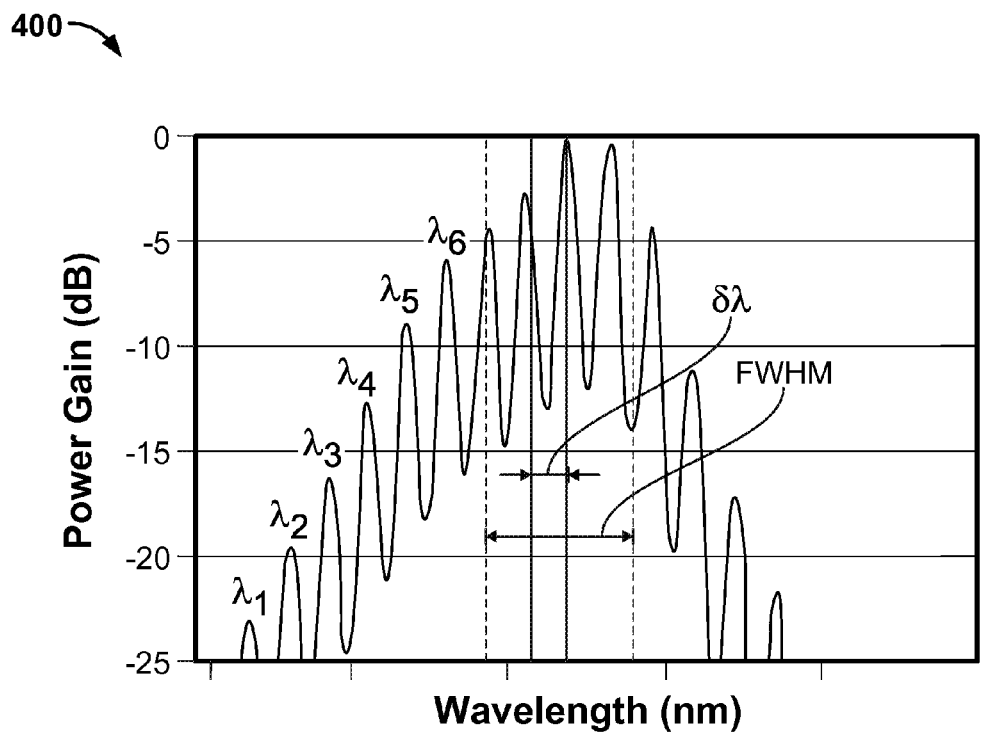
FIG. 4 is a plot of a spectrum of wavelength and power gain of a Raman pump light source.
Figure 5:
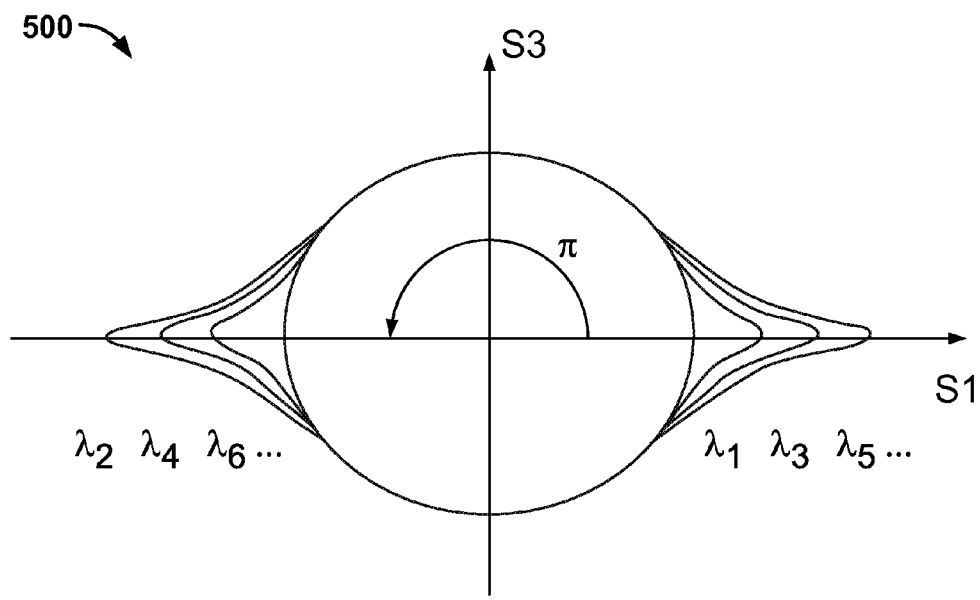
FIG. 5 illustrates a decay of a polarization degree of a Raman pump light in Stokes space.

Therefore, it is obtained through calculation that:

$$2[2L_3\Delta n + L_4(n_2-1)]\delta\lambda = \lambda \times (\lambda+\delta\lambda) \quad \text{(Equation 9)}$$

where $\delta\lambda$ is the wavelength difference of the wavelengths that two neighboring peaks correspond to as shown in FIG. 4, which can be obtained by scanning the light source, while the index of refraction difference $\Delta n$ and the index of refraction of the delayer $n_2$ can be determined according to the materials of the birefringent crystal 24 and the delayer 25. When the length $L_3$ of the birefringent crystal 24 is determined, the length $L_4$ of the delayer can be calculated.

Since the two beams split from a combined beam when it enters the birefringent crystal 24 are ordinary light and extraordinary light, $\Delta n$ is the difference of indexes of refraction of the beams L31 and L32 inside the birefringent crystal 24.

As long as the length $L_3$ of the birefringent crystal 24 and the length $L_4$ of the delayer 25 meet the above requirement, the depolarization module can depolarize the polarized light, such that the polarization states of the beams emitted from the birefringent crystal 26 cancel each other, and thereby provide depolarization.

Thus, after a beam passes through the light-combining isolation module and the depolarization module, two beams are combined and depolarized, and beams reflected by will not enter the pump light source to affect the pump light source.

FIG. 10 illustrates an example depolarization module 1000. The depolarization module 1000 can be used in combination with a light-combining isolation module, e.g., light-combining isolation module 602, to form an optical depolarizer.

The depolarization module 1000 includes a polarization splitter 27, a delayer 28, and a polarization combiner 29. The polarization splitter 27 is used to split the light and is the light-splitting component in this example depolarization module. The polarization combiner 29 is used to substantially combine beams on two optical paths and is the light-combining component in this example depolarization module. The delayer 28 is disposed between the polarization splitter 27 and the polarization combiner 29, and the delayer 28 is disposed on an emitting optical path of the polarization splitter 27.

Two beams L51 and L52 with mutually perpendicular polarization states enter the polarization splitter 27. A polarization beam splitting film is coated on the light-splitting surface 51 of the polarization splitter 27. The polarization beam splitting film can transmit a light component with one polarization state and reflect a light component with another polarization state where the polarization state of the transmitted light component is perpendicular to the polarization state of the reflected light component.

The polarization splitter 27 includes a polarizing axis, which corresponds to the polarization direction of the beam transmitted by the polarization beam splitting film. Similarly, the polarization combiner 29 also comprises a polarizing axis, which has the same direction as that of the polarizing axis of the polarization splitter 27. Moreover, the projection of the polarizing axis of the polarization splitter 27 on an emitting plane of the polarizer 23 forms a 45° angle with the optic axis of the polarizer 23.

On the light-splitting surface 51, the beam L51 and the beam L52 become, respectively, beams L53 and L55 having mutually perpendicular polarization states and, beams L54 and L56 having mutually perpendicular polarization states. The beams L53 and L54, having a same polarization state, are transmitted through the light-splitting surface 51 and emitted to form beams L57 and L58. Beams L57 and L58 directly enter the light-combining surface 54 of the polarization combiner 29.

The beams L55 and L56, having a same polarization state, are reflected on the light-splitting surface 51, and then reflected by the reflecting surface 52 to form beams L59 and L60. The beams L59 and L60 pass through the delayer 28 to form beams L61 and L62. The beams L61 and L62 enter the reflecting surface 53 to form reflected beams L63 and L64, and enter the light-combining surface 54 of the polarization combiner 29. The light-combining surface 54 is also coated with a polarization beam splitting film to combine beams.

The beams L63 and L64, the beams L57 and L58 that are reflected and transmitted, respectively, are combined into the same optical path on the light-combining surface 54 to be emitted to form beams L65, L66, L67 and L68, respectively. In the above process, the polarization states of all beams do not change from the polarization states following the light-splitting surface 51. Thus, beams L53 and L54 have the same polarization state as beams L67 and L68. Beams L55 and L56 have the same polarization state as beams L65 and L66.

Therefore, the depolarization module in this example still splits two beams on the same optical path, directs beams having a first polarization to pass through a delayer, thereby generating a delay, and lastly combines the two beams and emits the two beams on the same optical path.

It can be seen from FIG. 10 that the beam with the first polarization state travels the paths of the beams L55 and L56, L63 an L64 more than the beam with the second polarization state. In such a circumstance, assume that the vertical distance traveled by the beams L55 and L56 in the polarization splitter 27 is L5, while the length of the delayer 28 is L6, L5 and L6 can be used to replace L3 and L4 in Equation 7, Equation 8 and Equation 9, respectively, according to the depolarization principle described above. Consequently, the relationship between the length L5 and the length L6 of the delayer 28 can be obtained, namely:

$$\Gamma(\lambda) - \Gamma(\lambda+\delta\lambda) = 2\pi[2L_5 n + L_6(n_2-1)]/\lambda - 2\pi[2L_5 n + L_6(n_2-1)]/(\lambda+\delta\lambda) = (2m+1)\pi \quad \text{(Equation 10)}.$$

Polarization beam splitting films are typically coated on the same glass substrate, n is the index of refraction of the glass substrate used for light-splitting components and light-combining components, and $n_2$ is the index of refraction of the delayer 28.

When m=0, Equation 10 becomes:

$$2[2L_5n+L_6(n_2-1)]\delta\lambda=\lambda(\lambda+\delta\lambda) \quad \text{(Equation 11)}.$$

Therefore, the relationship between the length of the light-splitting component and the length of the delayer can be determined. Assume that a beam enters the light-splitting component and is split into two beams, its propagation distance in the birefringent crystal or the additional distance traveled by one beam is L, the length of the delayer is L', and the difference of index of refraction is $n_1$. The difference of index of refraction $n_1$ refers to the difference of index of refraction between the index of refraction of ordinary light and the index of refraction of extraordinary light propagated in the birefringent crystal, or the index of refraction of one of the beams propagated in the polarization light-splitting prism. The index of refraction of the beam propagated in the delayer is $n_2$. Therefore, the relationship between the distance L and the length L' can be obtained according to:

$$\Gamma(\lambda)-\Gamma(\lambda+\delta\lambda)=2\pi[2Ln_1+L'(n_2-1)]/\lambda-2\pi[2Ln_1+L'(n_2-1)]/(\lambda+\delta\lambda)=(2m+1)\pi \quad \text{(Equation 12)}$$

where m is an integer greater than or equal to zero. If m=0, then:

$$2[2Ln_1+L'(n_2-1)]\delta\lambda=\lambda(\lambda+\delta\lambda) \quad \text{(Equation 13)}$$

with the above setting, linear polarized light can be depolarized, and at the same time, two beams can be combined and the isolation function is provided.

FIG. 11 illustrates the structure of an example optical depolarizer 1100. The optical depolarizer 1100 includes a light-combining module 1112 and a depolarization module 1114. The light-combining 1112 module includes a birefringent prism 31. The depolarization module 1114 includes a birefringent crystal 34 as the light-splitting component, a delayer 35, and a birefringent crystal 36 as the light-combining component. The structure and working principle of the depolarization module 1114 are similar to the depolarization module 604 described above with respect to FIG. 6.

The birefringent prism 31 includes two crystals 32 and 33. The optic axis of the crystal 32 and the optic axis of the crystal 33 are perpendicular to each other, i.e. the optic axis of the crystal 32 forms a 90° angle with the optic axis of the crystal 33. Moreover, the projection of the optic axis of the birefringent crystal 34 on an emitting plane of the crystal 33 forms a 45° angle with the optic axis of the crystal 33. The birefringent prism 31 may be, for example, a Wollaston prism, a Rochon prism, a Nomarski prism, or a Senarmont prism that can perform division and combination of polarized light.

After entering the birefringent prism 31, the beam L81 and the beam L82 substantially converge to form one beam L83 to be emitted to the birefringent crystal 34, where the polarized light is depolarized by the depolarization module 1114. Additionally, the projection of a polarizing axis of the birefringent crystal 34 on an emitting plane of the crystal 33 forms a 45° angle with the polarizing axis of the crystal 33.

The light-combining module in this example does not include an isolation function, which is mainly used in situations where there is no need to isolate beams reflected by the subsequent system.

In some alternative implementations, the depolarization module 1114 in this example can be replaced by the depolarization module 1000 describe above, which can also depolarize the polarized light.

FIGS. 12 and 13 illustrate the structure of an example optical depolarizer 1200. FIG. 12 is a perspective diagram of the optical depolarizer 1200. FIG. 13 is a block diagram of the optical depolarizer 1200.

The optical depolarizer 1200 includes an isolation module 1202 and a depolarization module 1204. The isolation module 1202 includes wedges 41 and 43 and a rotator 42, e.g., a Faraday rotator. The depolarization module 1204 includes birefringent crystals 44 and 46 and a delayer 45. The structure and working principle of the depolarization module 1204 similar to the depolarization module 604 described above with respect to FIG. 6.

A crystal axis of the wedge 41 forms a 45° angle with a crystal axis of the wedge 43, and the incident plane 65 of the wedge 41 forms an acute angle with the axis of the isolation module 1202. An emitting plane 66 of the wedge 41 is perpendicular to the axis of the isolation module 1202. An incident plane 67 of the wedge 43 is parallel to the emitting plane 66 of the wedge 41, and the emitting plane 68 of the wedge 43 is parallel to the incident plane 65 of the wedge 41. Moreover, a projection of an optic axis of the birefringent crystal 44 on the emitting plane 68 of the wedge 43 forms a 45° angle with the crystal axis of the wedge 43.

The rotator 42 is disposed between the wedge 41 and the wedge 43. In some implementations, the rotator 42 is a Faraday rotator that operates in response to a magnetic field. In particular, when a beam passes through the Faraday rotator, its polarization state is rotated by 45°.

When the beam L71 enters the wedge 41, it separates to form beams L72 and L73, each having mutually perpendicular polarization states. After the beams L72 and L73 enter the rotator 42, they form beams L74 and L75, respectively. Relative to the beams L72 and L73, the polarization states of the beams L74 and L75 are rotated by 45°, respectively. Subsequently, the beams L74 and L75 enter the wedge 43, forming beams L76 and L77, respectively. The beams L76 and L77 are combined after being emitted from the wedge 43 and propagated on the same optical path, and then enter the depolarization module 1204. In some implementations, the two beams overlap and propagate in parallel, with the beam centers offset slightly in the plane of the drawing shown in FIGS. 12-13. The isolation module 1202 can isolate light reflected by the subsequent system. The isolation module 1202 can include a conventional optical isolator. A typical optical isolator allows a beam of light to pass in a chosen direction, but generally prevents light from passing on the opposite direction. An example optical isolator includes a rotator, e.g., a Faraday rotator, positioned between first and second birefringent wedges. When incoming light from an input fiber enters a first birefringent wedge, it is divided into two beams having perpendicular polarizations, in particular, an ordinary light (o light) and an extraordinary light (e light), with the polarization of the o light perpendicular to the first birefringent wedge's optic axis and the polarization of the e light parallel to the first birefringent wedge's optic axis. The rotator rotates the polarizations of the two beams. After the rotation, the o light's polarization is still perpendicular to the second birefringent wedge's optic axis so that it remains o light, Similarly, the e light still remains e light, After passing through the second wedge, the two beams become parallel to each other with a small offset and exit, for example, to a collimator.

In the reverse direction, due to the nonreciprocal rotation of the rotator, the o light and e light of the second birefringent wedge become the e light and o light of the first birefringent wedge, respectively, so that when the two beams come out of the first birefringent wedge, they are not parallel to each other. The two beams are refracted downward and upward with an angle such that the two beams cannot be focused onto the input fiber and are dissipated away.

The depolarization module 1204 in this example can be replaced by the depolarization module 1000 describe above.

The depolarization module 1204 splits the entering beam into two beams, makes one of the beams pass through a delayer, and lastly combines the two beams through a light-combining component for output. In such a way, a beam is delayed through a delayer, which ensures a certain optical path difference between the two beams, such that the optical path difference meets the requirement that a beam at a wavelength of a power peak is different from the beam of the wavelength of the neighboring power peak by an odd number of times of half a cycle, thereby achieving the depolarization of polarized light. As a result, a very long polarization maintaining optical fiber or a very long depolarization wave-plate is not needed, which reduces the production cost of the optical depolarizer and reduces the volume of the optical depolarizer.

Other implementations are possible. For example, a birefringent displacement piece can take the place of the birefringent prism, or a device with a polarization splitting/combining film can be used to combine and split light.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An optical depolarizer, comprising:
a light-combining module comprising a birefringent prism, wherein an optic axis of a first crystal of the birefringent prism forms a 90° angle with an optic axis of a second crystal of the birefringent prism; and
a depolarization module, wherein the depolarization module is disposed at a light emitting end of the light-combining module, the depolarization module comprising:
 i) a light-splitting component, wherein the light-splitting component separates orthogonally polarized light into a first light beam and a second light beam, wherein a polarizing axis projection of the light-splitting component on an emitting plane of the light-combining module forms a 45° angle with the optic axis of the second crystal of the light-combining module,
 ii) a delayer, wherein the delayer is configured to delay a propagation of the first light beam,
 iii) a light-combining component, wherein the light-combining component combines the second light beam and the first light beam.

2. The optical depolarizer of claim 1, wherein the light-splitting component is a polarization beam splitter and the light-combining component is a polarization beam combiner.

3. The optical depolarizer of claim 1, wherein the delayer is a glass piece or a third birefringent crystal.

4. An optical depolarizer, comprising:
an isolation module, the isolation module comprising a first wedge, a rotator disposed at the light emitting end of the first wedge, and a second wedge disposed at the light emitting end of the rotator, wherein a crystal axis of the first wedge forms a 45° angle with a crystal axis of the second wedge; and
a depolarization module,
wherein the depolarization module is disposed at the light emitting end of the isolation module, the depolarization module comprising:
 i) a light-splitting component, wherein the light-splitting component separates orthogonally polarized light into a first light beam and a second light beam, wherein a polarizing axis projection of the light-splitting component on an emitting plane of the second wedge forms a 45° angle with the crystal axis of the second wedge,
 ii) a delayer, wherein the delayer is configured to delay a propagation of the first light beam,
 iii) a light-combining component, wherein the light-combining component combines the second light beam and the first light beam.

5. The optical depolarizer of claim 4, wherein, the light-splitting component is a polarization beam splitter and the light-combining component is a polarization beam combiner.

6. The optical depolarizer of claim 4, wherein the delayer is a glass piece or a birefringent crystal.

7. An optical depolarizer, comprising:
a light-combining isolation module, the light-combining isolation module comprising a first polarizer, a rotator disposed at the light emitting end of the first polarizer, and a second polarizer disposed at the light emitting end of the rotator; and a depolarization module, wherein the depolarization module is disposed at a light emitting end of the light-combining isolation module, the depolarization module comprising
  i) a light-splitting component, wherein the light-splitting component separates orthogonally polarized light into a first light beam and a second light beam, wherein a polarizing axis projection of the light-splitting component on an emitting plane of the second polarizer forms a 45° angle with the optic axis of the second polarizer,
  ii) a delayer, wherein the delayer is configured to delay a propagation of the first light beam,
  iii) a light-combining component, wherein the light-combining component combines the second light beam and the first light beam.

8. The optical depolarizer of claim 7, wherein the light-splitting component is a first birefringent crystal or a polarization beam splitter and the light-combining component is a second birefringent crystal or a polarization beam combiner.

9. The optical depolarizer of claim 7, wherein the delayer is a glass piece or a birefringent crystal.

\* \* \* \* \*